United States Patent [19]

Clasen et al.

[11] Patent Number: 4,684,387

[45] Date of Patent: Aug. 4, 1987

[54] METHOD FOR MANUFACTURING GLASS BODIES

[75] Inventors: Rolf Clasen, Aachen; Wilhelm G. Hermann, Roetgen, both of Fed. Rep. of Germany

[73] Assignee: U.S. Philips Corporation, New York, N.Y.

[21] Appl. No.: 832,209

[22] Filed: Feb. 24, 1986

[30] Foreign Application Priority Data

Mar. 29, 1985 [DE] Fed. Rep. of Germany ....... 3511457

[51] Int. Cl.⁴ .......................................... C03B 37/016
[52] U.S. Cl. ...................................... 65/18.4; 65/3.11; 65/3.12; 65/17; 65/DIG. 16; 65/900; 65/901; 264/23; 264/27; 264/60; 156/DIG. 108; 501/12
[58] Field of Search ...................... 65/2, 3.11, 3.12, 17, 65/18.1, 18.3, 18.4, DIG. 16, DIG. 900, DIG. 901; 501/12; 156/DIG. 108; 264/60, 23, 27

[56] References Cited

U.S. PATENT DOCUMENTS

| | | | |
|---|---|---|---|
| 4,220,461 | 9/1980 | Samata | 501/12 X |
| 4,416,680 | 11/1983 | Brüning et al. | 65/18.1 |
| 4,419,115 | 12/1983 | Johnson et al. | 501/12 X |
| 4,561,872 | 12/1985 | Luong et al. | 65/17 |

*Primary Examiner*—Robert L. Lindsay
*Attorney, Agent, or Firm*—Norman N. Spain

[57] ABSTRACT

A method of and arrangements for manufacturing glass bodies, in which the starting material for the glass body, being a suspension having a microdispersed solids content, is used to form a porous green body which is subsequently purified and sintered, in which, by separating the phases of the suspension in an arrangement in which a pressure difference can be built up, the green body is deposited on a porous membrane whose shape corresponds to that of the glass body to be produced, the pores of the membrane having a diameter in the range from 1 to 500 times the average particle diameter of the solids content of the suspension.

15 Claims, 3 Drawing Figures

METHOD FOR MANUFACTURING GLASS BODIES

BACKGROUND OF THE INVENTION

The invention relates to a method of manufacturing glass bodies, in which the starting material for the glass body is a suspension having a microdispersed solids content which is used to form a porous green body which is subsequently purified and sintered.

The invention further relates to arrangements for carrying out such a method as well as to the use of the glass bodies manufactured by the method in accordance with the invention.

The method mentioned in the opening paragraph is particularly suitable for the manufacture of preforms for optical waveguides.

For the manufacture of very pure quartz-glass bodies, particularly preforms for optical waveguides, methods are known in which a porous green body is manufactured from micro-dispersed $SiO_2$ glass particles, after which the said green body is first purified in, for example, a chlorine-containing atmosphere at temperatures ranging from 600° to 900° C. Next, the green body is sintered at a temperature of approximately 1500° C. to form compact and transparent glass; the sintering temperature depends upon the size of the $SiO_2$ particles and the homogeneity of the green body.

Processing of micro-dispersed quartz-glass particles involves a substantial investment in equipment (preforms for the manufacture of a green body which is easy to manipulate and presses to compact this green body) in order to obtain a green body having a density which is so high as to enable an efficient sintering process, i.e. sintering at temperatures $\leq 1550°$ C. to form a glass body which is free from bubbles and reams. Such a method for the manufacture of a preform for optical waveguides is known from, for example, DE-PS No. 32 40 355.

For the manufacture of green bodies having a sufficiently high density, an alternative method may be used in which micro-dispersed $SiO_2$ suspensions are deformed into a green body. DE-OS No. 29 25 309 describes a method in which a $SiO_2$ suspension is sprayed in or on a carrier tube. A disadvantage of this method is that high demands are made on the spraying arrangement as regards the necessity of an even distribution of the $SiO_2$ suspension, and that purification of the green body in a hot gaseous atmosphere which reacts with the impurities is impossible because the carrier tube is not porous.

BRIEF SUMMARY OF THE INVENTION

It is an object of the invention to provide a method of and arrangements for manufacturing high-purity glass bodies by means of which a green body of such porosity is obtained that the green body can be thoroughly purified in an intermediate heating stage in a gaseous atmosphere which reacts with the impurities present, and which green body, already has such a high density that the subsequent sintering process can be carried out without any additional compacting operations.

This object is achieved by a method in accordance with the invention, in which, by separating the phases of the suspension in an arrangement in which a pressure difference can be built up, the green body is deposited on a porous membrane whose shape corresponds to that of the glass body to be produced, the pores of the membrane having a diameter in the range from 1 to 500 times the average particle diameter of the solids content of the suspension.

Arrangements for carrying out this method are characterized by 1. a vessel which can be evacuated by means of an exhaust tube and in which a porous membrane, whose shape corresponds to that of the glass body to be produced is arranged, which membrane has, in the deposition area, pores of a diameter in the range between 1 and 500 times the average particle diameter of the solids content of a suspension to be separated in phases in the arrangement, said pores being preferably $\leq 20$ μm, and which membrane has a non-porous inlet via which the starting material which is to be separated in phases can be introduced in the form of a suspension, which inlet is situated outside the evacuation area of the vessel and is sealed from said evacuation area by sealing means, or 2. a vessel in which starting material which is to be separated into phases can be introduced in the form of a suspension, and which has a porous membrane whose shape corresponds to that of the green body to be produced and which is immersed in the suspension and can be evacuated by means of an exhaust tube, the pores of the membrane having a diameter, in the deposition area, in the range between 1 and 500 times the average particle diameter of the solids content of a suspension to be separated in phases in the arrangement, said pores being preferably $\leq 20$ μm.

DETAILED DESCRIPTION OF THE INVENTION

Figure 1:
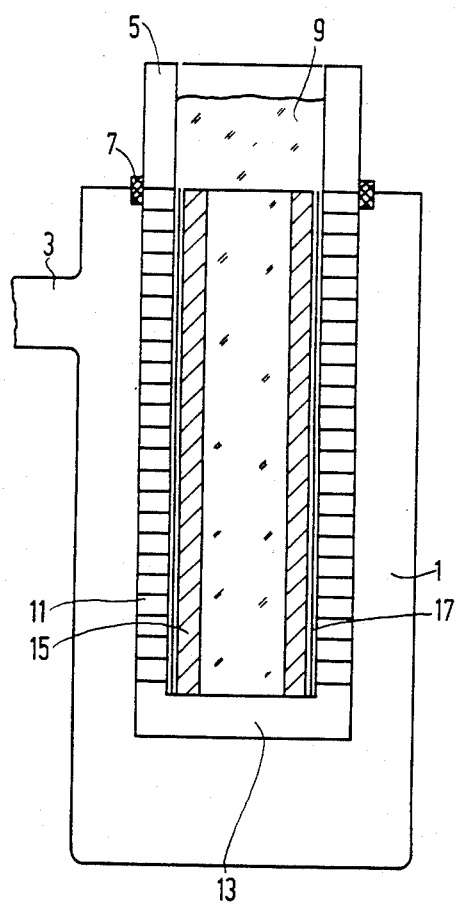
FIG. 1 is a sectional view of an arrangement for the manufacture of tubular green bodies by the method of the invention.

In accordance with advantageous embodiments of the method in accordance with the invention, an underpressure or an overpressure is produced in the arrangement. This has the advantage that a relatively high deposition rate of the solids content of the suspension is obtained.

In accordance with further advantageous embodiments of the method in accordance with the invention, a suspension is used as the starting material for the glass body, which comprises $SiO_2$ particles having a diameter in the range from 10 to 500 nm, preferably between 15 and 100 nm, the average particle diameter being 40 nm at a weight ratio between solid matter and water from 1:1 to 1:2. This has the advantage that green bodies can be obtained having an advantageously high density which is desired for an efficient sintering process of the green body.

In accordance with a further advantageous embodiment of the method in accordance with the invention, an ionogenic additive is added to the suspension causing the pH value of the suspension to move towards alkalinity (pH $\leq 10$). Preferably, an ammonium compound is used for this purpose in an amount of from 0.1 to 5% by weight of the solids content of the suspension. This additive is very volatile and can be fully removed from the green body in a subsequent purifying-heating step, so that very pure quartz glass bodies can be produced. Due to the addition of an ammonium compound, for example $NH_3$ in an aqueous solution, green bodies having a relatively great strength are obtained because this compound promotes cross-linking, gel-formation taking place at the contact area of two of the $SiO_2$ primary particles. At a suspension temperature of, for example, 20° C. and a pH value $\leqq$ 10 $SiO_2$ dissolves at a rate of 100 ppm and is deposited at the contact areas, such that a bridging layer is formed. If, for example, $NH_4F$ in an aqueous solution is used as an ionogenic additive, the refractive index may be lowered by doping the starting material with fluorine. Such types of glass can suitably be used as cladding glasses for optical waveguides.

In accordance with an advantageous embodiment of the method in accordance with the invention, a laminated body is formed on the membrane by depositing in succession varous layers of differently doped suspensions. For this purpose, the first suspension is removed from the arrangement as soon as the required layer thickness of the green body is obtained, and the deposition process is continued with a second suspension which is, for example, differently doped. Thus, the present method is very suitable for the manufacture of preforms for optical waveguides having a step refractive index profile. It is also possible to produce an optical waveguide having a W - shaped profile by providing an intermediate layer having a lower refractive index, which layer is obtained through the use of a suitably doped suspension. Dopants for changing the refractive index of a glass body are known to those skilled in the art, for example $GeO_2$ or $Al_2O_3$ are used to increase the refractive index and $B_2O_3$ or fluorine are used to lower the refractive index. The present method also enables the manufacture of a quartz-glass body whose refractive index variation is substantially continuous, by depositing a plurality of layers having a graded doping. In accordance with a further advantageous embodiment of the method in accordance with the invention, a porous green body in which is formed from the starting material for the glass body to be produced is used as a membrane. This has the advantage that for the manufacture of preforms for optical waveguides by a method in accordance with the invention, the use of materials for the membrane, which may lead to the inclusion of impurities in the green body thus obtained, can be avoided; thus, the present embodiment of the method in accordance with the invention is also suitable for manufacturing high-precision optical waveguides having a step refractive index profile. In this embodiment, the membrane and the deposited green body are purified together in one purification step in a suitable, heated gaseous atmosphere, and next they are sintered together to form a transparent glass body. Instead of a porous not yet sintered body of the starting material for the glass body (green body), it is also possible to use a porous, sintered body of the starting material for the glass body as a membrane. In this connection it is particularly advantageous that layers formed from the solids content of the suspension can be manufactured by means of a grain fraction which is changed with respect to the grain fraction used for the manufacture of such a mechanisme. The contraction behaviour of a body depends upon the grain fraction; if a sintered body formed from the starting material for the glass body is used as a membrane, it is possible to adapt the contraction behaviour of the membrane and the layer to be deposited thereon to each other.

If in accordance with an advantageous embodiment of the method in accordance with the invention, the green body is deposited on a membrane whose deposition area is coated, in particular with a synthetic resin lining, whose porosity is $\leqq$ the average particle diameter of the solids content of the suspension, a synthetic membrane of, preferably, polyethylene being used having a pore diameter in the range from 10 to 20 $\mu m$, this results in the advantage that also larger green bodies can be deformed without any problems. Preferably, the lining is made of a hydrophylic synthetic resin.

In the case of green bodies of larger dimensions, it may be advantageous to use a divisible membrane which consists of various parts instead of a membrane in one piece.

A further advantage of the invention is that green bodies for the manufacture of glass bodies, particularly performs for optical waveguides, can be obtained with only very few equipment, which green bodies are on the one hand sufficiently porous to effectively remove impurities in a heated gas atmosphere and on the other hand have such a high density and homogeneity that they can be sintered to form very pure glass bodies without the necessity of any intermediate treatment such as, for example, hot isostatic pressing. A further important advantage of the method of the present invention is that it is also possible to produce green bodies having other than circular cross-sections, for example, angular tubes or rods or randomly shaped cavities. The deposited green bodies can be dried without the development of cracks and after the purification and sintering steps they yield true to scale, transparent and very pure types of glass having very smooth surfaces. Quartz-glass tubes manufactured as described above may further be used in the manufacture of halogen lamps or gas-discharge lamps, where, as also applies to green bodies which are to be used for producing optical waveguides, a very low water content and a high silicon dioxide content are imperative.

Separating the dispersing liquid from the solid phase of the suspension through the difference in pressure in the arrangement, results in the formation of a relatively dry, solid green body whose density ranges from 38 to 50% of the density of compact glass, which green body is easy to manipulate and which can be freed, in a relatively short time and without the development of cracks, from the residual moisture, for example, by drying it under atmospheric conditions or by an exchange of solvents. These drying processes are known to those skilled in the art.

If a membrane having a pore size between 10 and 20 $\mu m$ is used to separate the solids content from the suspension, where the solid particles have an average size of 40 nm, the layer which is deposited in the beginning of the separation process forms an additional finefiltering layer which excludes a further penetration of the solids particles from the suspension into the membrane.

The effect of an additional fine-filtering layer can also be attained by coating the membrane of its deposition surface with a porous lining, the pore size being $\leqq$ the average particle diameter of the solids content of the suspension. Such a lining is suitably made of a hydrophylic synthetic resin.

Figure 2:
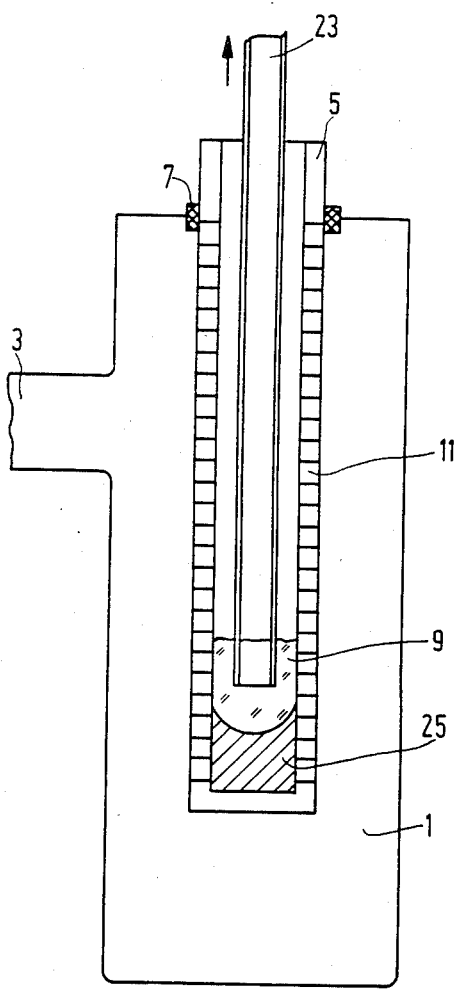
FIG. 2 is a sectional view of a modification of the arrangement of FIG. 1 for the manufacture of rod-shaped bodies in accordance with the method of the invention.
Figure 3:
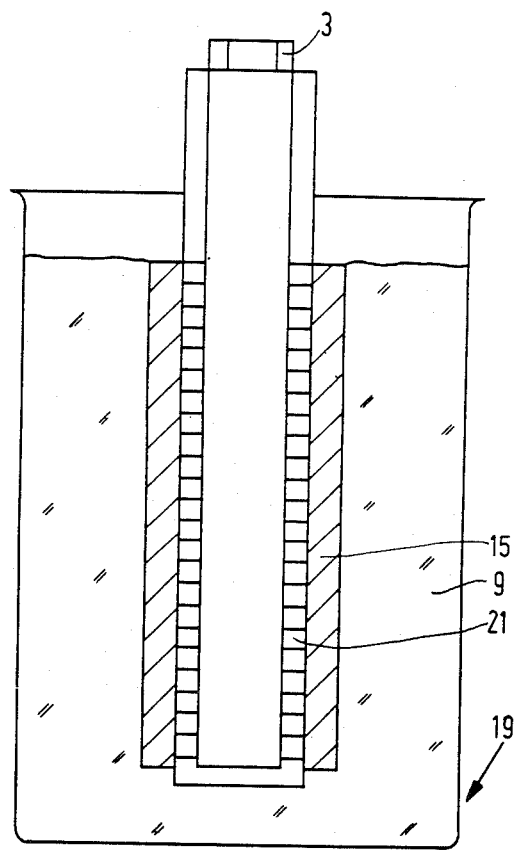
FIG. 3 is a sectional view of an additional arrangement for carrying out the method of the invention.

The invention will now be described by way of examples of embodiments, with reference to the accompanying drawing in which FIG. 1 is a sectional view of an arrangement for the manufacture of tubular green bodies by the method in accordance with the invention, FIG. 2 is a sectional view of a modified embodiment of the arrangement in accordance with FIG. 1 for the manufacture of rod-shaped green bodies, FIG. 3 is a sectional view of a further arrangement for carrying out the method in accordance with the invention.

FIG. 1 shows an arrangement for the manufacture of a tubular green body 15. For this purpose, a preferably aqueous suspension which is homogenised in, for example, an ultrasonic field and which is formed from microdispersed $SiO_2$ particles whose diameter ranges from 10 to 500 nm, preferably 15 to 100 nm, the average diameter being 40 nm, in which suspension water is used as a dispersing fluid (solid water to weight ratio from 1:1 to 1:2) to which $NH_3$ in an aqueous solution is added in an amount between 0.1 and 5% by weight relative to the solids content of the suspension, is introduced in a tubular membrane 11 having an internal diameter of 24 mm, which membrane at the location of the deposition area of the green body has pores having a size of 20 μm. The membrane 11, which is sealed by means of sealing means 7, is arranged in a vessel 1 which can be evacuated through an exhaust tube 3. In order to attain a high deposition rate of the solid, the pressure should, preferably, correspond to the partial pressure of the dispersing fluid. In order to more readily remove the green body 15 from the mould, a hose having fine pores of a diameter $\leq 40$ nm may be used as a lining 17. Such a lining may be, for example, a synthetic resin hose as used in dialysis processes. Hydrophilic synthetic resins, for example, surface-modified polyethylenes, are to be preferred.

In a practical example of an embodiment using an arrangement as shown in FIG. 1, the following procedure was adopted: 200 g of commercially available $SiO_2$ having a particle size of 15–100 nm and an average particle diameter of 40 nm are dispersed in 300 ml of water and 7 ml of aqueous 25% ammonia solution until a homogeneous suspension is obtained. Homogenization may be obtained, for example, by applying an ultrasonic field having a frequency $f = 35$ kHZ to the suspension. This suspension is separated into phases, as described with reference to FIG. 1, by producing an underpressure of 15 mbar. The green body obtained after a deposition time of 15 minutes is slowly dried in the arrangement in order to remove the residual moisture.

The green body thus obtained has a density of 42% of the density of compact quartz-glass. Subsequently, the green body is heated in 100 minutes to a temperature of 800° C. and in order to remove any impurities, particularly water and transition metals, it is subjected to an $O_2$-gas stream which is saturated with $SOCl_2$. The subsequent sintering process is carried out in a helium atmosphere comprising 2% by volume of chlorine gas at a temperature of 1500° C., the green body being led through the oven at a speed of 3 mm/min. A transparent glass tube having an outer diameter of 18 mm, a wall thickness of 3 mm and impurities $\leq 10$ ppb is obtained. The glass thus formed has a density of 2.20 g/cm$^3$ and a refractive index $n_D$ of 1.4598.

In accordance with the above-described method, it is also possible to form layer structures from differently doped $SiO_2$ suspensions. For this purpose, the suspension is evacuated from the arrangement and replaced by another, differently doped suspension as soon as it has attained the desired layer thickness. In this way green bodies can be formed which after sintering result in types of glass having a refractive index gradient.

FIG. 2 depicts an arrangement by means of which a rod-shaped green body 25 can be formed from the suspension 9, in analogy to the method described with respect to FIG. 1. Via a filling tube 23 which is movable along the axis of the membrane which is formed by the tube 11, the homogenised suspension 9 is introduced in the tube 11. Due to the deposition of $SiO_2$ particles in the entire cross-section of the tube, a rod-shaped green body 25 is formed. The filling tube 23 is pulled up synchronously with the growth of the green body 25. Due to the face that the suspension 9 is introduced in the tube 11 via the movable filling tube 23, it becomes possible to so control the deposition process that the highest solid concentration is always in the lower part of the suspension in the arrangement and, consequently, a compact green body can be formed.

The suspension used, the deposition conditions as well as the finishing of the green body obtained and the properties of the quartz-glass bodies obtained correspond to the example described with reference to FIG. 1, only the deposition time is different, namely 120 minutes in the present example, as it concerns the deposition of a solid rod.

A green body 15 of, for example, tubular shape may be produced on the outer surface of, for example, a cylindrical membrane 21 which has a porous deposition area (see FIG. 3). For this purpose, the homogenised suspension 9 is introduced in a vessel 19 and the membrane 21 which is introduced in the suspension is evacuated from the inside by means of an exhaust tube 3.

The suspension used, the deposition conditions as well as the finishing of the green body obtained and the properties of the quartz-glass body obtained also correspond to the example described with reference to FIG. 1.

A porous green body which is formed from the starting material for the glass body may advantageously be used as a membrane, where the green body may already have been sintered. Polyethylene filtering tubes having a pore diameter in the range from 10 to 20 μm may, for example, also be used as membranes. When such synthetic resin membranes are in addition coated, at the location of the deposition area, with a porous lining having pores $\leq 40$ nm, particularly when the lining is made of a hydrophilic synthetic resin, there is the advantage that the green body obtained has a particularly smooth surface with a surface roughness $< 1$ μm, preferably even $< 0.5$ μm. Such smooth surfaces are very advantageous because unwanted recrystallisation of the green body during sintering is precluded.

What is claimed is:

1. In a method of manufacturing glass bodies, in which the starting material for the glass body, is a suspension having a microdispersed solids content which is used to form a porous green body which is subsequently purified and sintered, the improvement wherein the phases of the suspension are separated in an arrangement in which a pressure difference is built up, in said arrangement the green body being deposited on a porous membrane whose shape corresponds to that of the glass body to be produced, the pores of the membrane having a diameter in the range from 1 to 500 times the average particle diameter of the solids content of the suspension.

2. A method as claimed in claim 1, wherein an underpressure is produced in the arrangement.

3. A method as claimed in claim 1, characterized in that an overpressure is produced in the arrangement.

4. A method as claimed in claim 1, wherein an aqueous suspension is used as the starting material for the glass body, which suspension comprises $SiO_2$ particles having a diameter in the range from 10 to 500 nm, the average particle diameter being 40 nm.

5. A method as claimed in claim 1, wherein a suspension is used having a solid: water weight ratio of 1:1 to 1:2.

6. A method as claimed in claim 1, wherein an ionogenic additive is added to the suspension, thereby moving the pH value of the suspension towards alkalinity (pH $\leq$ 10).

7. A method as claimed in claim 6, wherein an ammonia compound is used as the ionogenic additive.

8. A method as claimed in claim 6, wherein the ionogenic additive is added in an amount of from 0.1 to 5% by weight of the solids content of the suspension.

9. A method as claimed in claim 1, wherein a laminated body is formed on the membrane by depositing in succession various layers of differently doped suspensions.

10. A method as claimed in claim 9, wherein suspensions are used having dopants which cause the layer of the glass body to be produced to have different refractive indices.

11. A method as claimed in claim 1, wherein a porous green body made of the starting material for the glass body to be produced is used as a membrane.

12. A method as claimed in claim 1, wherein the green body is deposited on a membrane whose deposition area is coated with a a synthetic resin lining having a porosity $\leq$ the average particle diameter of the solids content of the suspension.

13. A method as claimed in claim 1, wherein a polyethylene membrane is used.

14. A method as claimed in claim 11 wherein a membrane is used whose pores have a diameter $\leq 20$ $\mu$m.

15. A method as claimed in claim 1, wherein an underpressure up to 15 mbar or an overpressure up to 10 bar is produced in the arrangement.

* * * * *